(12) United States Patent
Nakagawa et al.

(10) Patent No.: US 7,140,458 B2
(45) Date of Patent: Nov. 28, 2006

(54) BATTERY ARRANGEMENT AND BATTERY MOUNTING STRUCTURE FOR A VEHICLE

(75) Inventors: Mitsuo Nakagawa, Wako (JP); Yoshiaki Tsukada, Wako (JP); Seiji Onozawa, Wako (JP); Kyoichi Ariga, Wako (JP); Yoshiyuki Horii, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 95 days.

(21) Appl. No.: 10/930,181

(22) Filed: Aug. 31, 2004

(65) Prior Publication Data

US 2005/0092535 A1    May 5, 2005

(30) Foreign Application Priority Data

Sep. 29, 2003  (JP) ............................. 2003-338820
Sep. 29, 2003  (JP) ............................. 2003-338821

(51) Int. Cl.
*B60R 16/00*   (2006.01)

(52) U.S. Cl. ..................................... 180/65.1; 180/219

(58) Field of Classification Search ............... 180/65.1, 180/65.4, 219, 220
See application file for complete search history.

(56) References Cited

U.S. PATENT DOCUMENTS

| 4,915,188 A | * | 4/1990 | Ota et al. ................... 180/219 |
| 5,044,646 A | * | 9/1991 | Iiga et al. ................... 180/219 |
| 5,101,924 A | * | 4/1992 | Yamagiwa et al. ......... 180/220 |
| 5,853,058 A | * | 12/1998 | Endo et al. ................ 180/65.1 |
| 6,446,745 B1 | * | 9/2002 | Lee et al. ................... 180/206 |
| 6,541,938 B1 | * | 4/2003 | Okamura et al. ........... 318/778 |
| 6,679,345 B1 | * | 1/2004 | Hirayama et al. ......... 180/65.3 |

FOREIGN PATENT DOCUMENTS

| JP | 4-358983 | 12/1992 |
| JP | 11-79065 | 3/1999 |

* cited by examiner

*Primary Examiner*—Lesley D. Morris
*Assistant Examiner*—L. Lum
(74) *Attorney, Agent, or Firm*—Hamre, Schumann, Mueller & Larson, PC

(57) ABSTRACT

A battery arrangement structure for a vehicle including a motor for transmitting drive force to a drive wheel, a battery for supplying electrical power to the motor, and a storage box. The motor is arranged on one side of a vehicle center line oriented in a longitudinal direction of the vehicle and the battery is arranged on an opposite side of the vehicle center line and around the storage box. A battery mounting structure for a vehicle having a composite battery that includes a plurality of electric cells stored in a battery case, and the battery case being covered from a side cover of an outer side part of a vehicle body cover. The composite battery is formed from a plurality of electrical cells arranged close together in a single row. The battery case includes an outer case half body with an outer shape that runs along an inner surface shape of the side cover.

6 Claims, 10 Drawing Sheets

FIG. 10
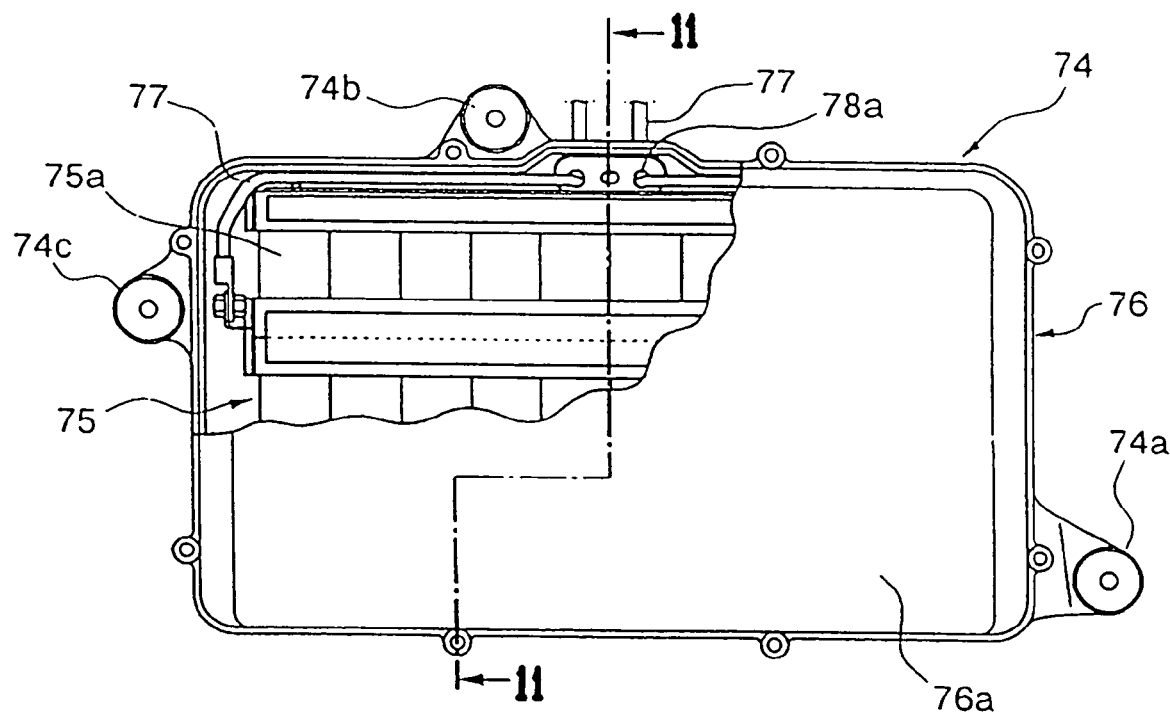
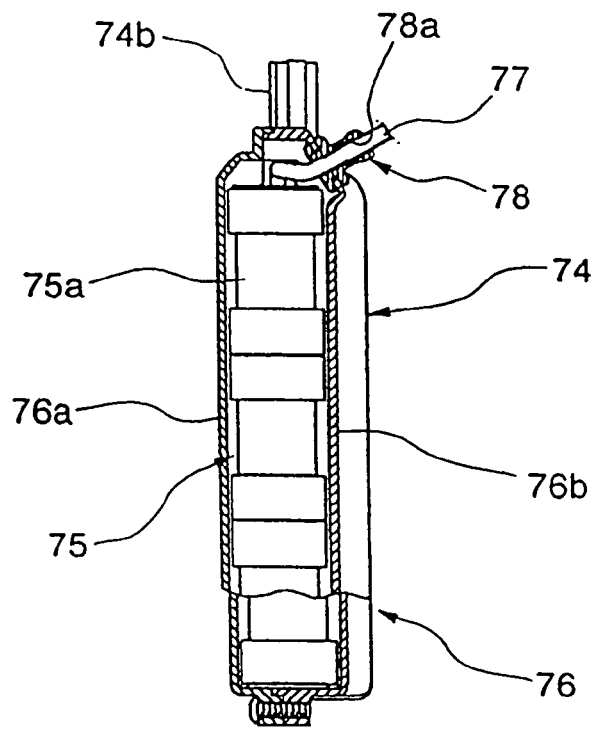
FIG. 11

FIG. 12
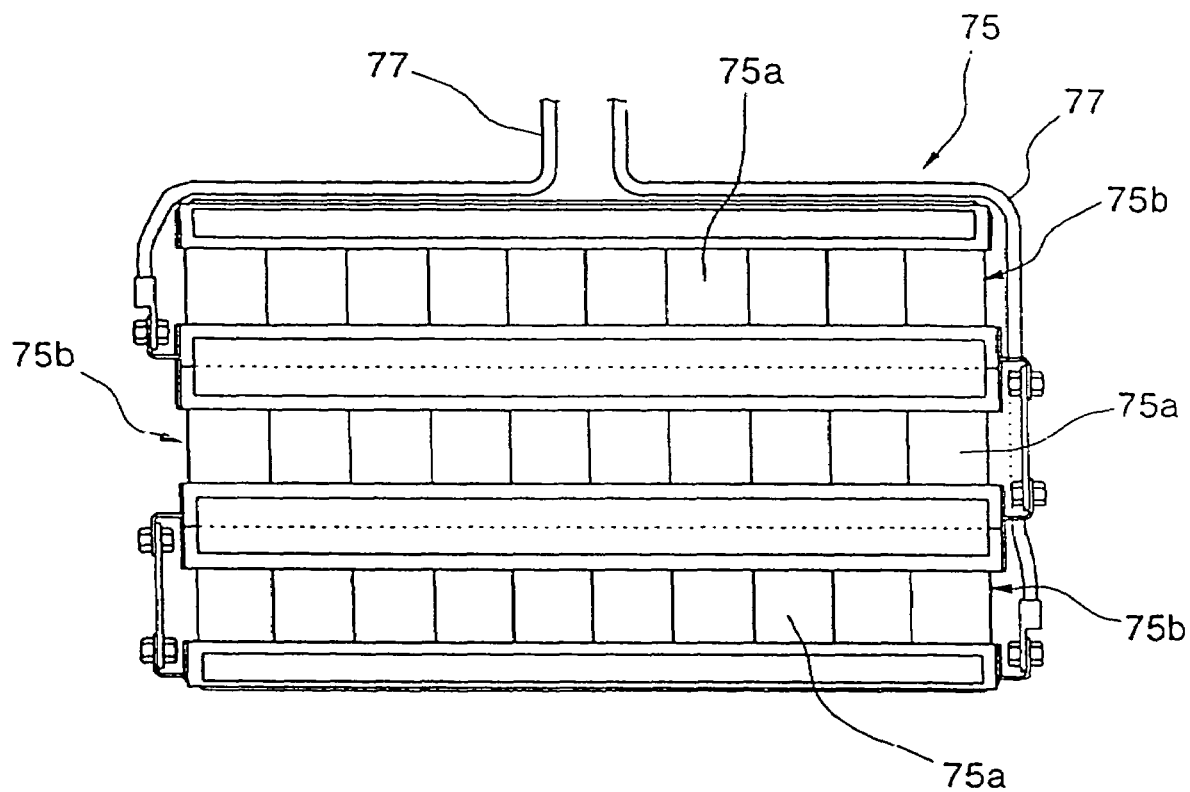
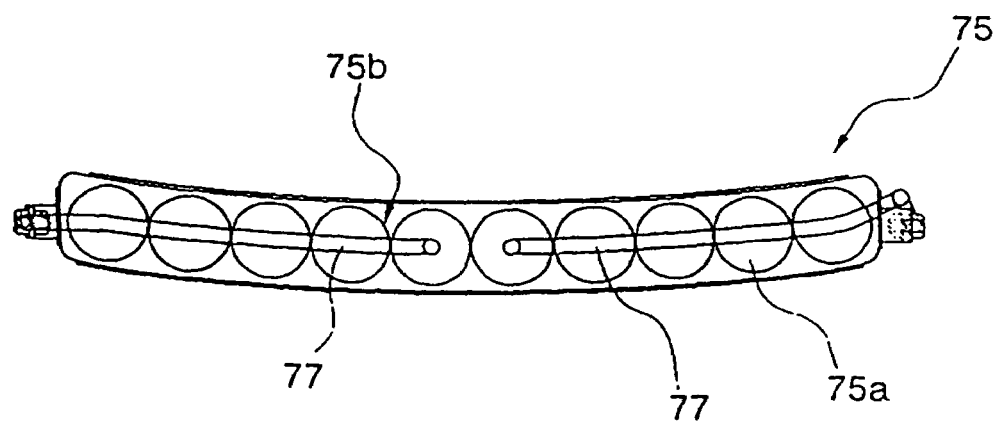
FIG. 13

BATTERY ARRANGEMENT AND BATTERY MOUNTING STRUCTURE FOR A VEHICLE

CROSS REFERENCE TO RELATED APPLICATIONS

This application is based on Japanese patent application nos. JP 2003-338820 and JP 2003-338821.

TECHNICAL FIELD OF THE INVENTION

This invention relates to a battery arrangement structure for a vehicle, having at least a motor as a drive power source. This invention relates to a battery mounting structure for a vehicle, including a battery for supplying electrical power to a motor functioning as a drive power source.

BACKGROUND OF THE INVENTION

From the related art, as a battery arrangement structure for an electric vehicle, there is known, for example, as disclosed in Japanese patent laid-open No. Hei. 4-358983, a structure with a battery provided beneath a seat, and a motor constituting a drive power source arranged below the battery. With a small two-wheeled vehicle, for example a scooter, it is common for a luggage box for storing a helmet or the like to be provided beneath a seat. However, in this type of two-wheeled vehicle, if a battery mounting structure as disclosed in Japanese patent laid-open No. Hei. 4-358983 is used, the battery is arranged beneath the seat storage space, the luggage box size is reduced by the arrangement of the battery.

A battery mounting structure for a vehicle for supplying electrical power to a motor functioning as a drive power source, there is known, as disclosed for example in Japanese patent laid-open No. Hei. 11-79065, a battery mounting structure stored inside a battery case in a state where a plurality of electrical cells are arranged close together in a single row. However, with the battery mounting structure of Japanese patent laid-open No. Hei. 11-79065, a battery case attached to a vehicle body directly constitutes part of the exterior. While, it has been considered to provide a vehicle body cover and to store a battery case inside the vehicle body cover, challenges remain to improve battery case layout efficiency and cooling capability.

SUMMARY OF THE INVENTION

The present invention has been conceived in order to solve the above described problems. One object of the present invention is to provide a battery arrangement structure for a vehicle to ensure ample storage space in a storage or luggage box. Another object of the invention is to improve external appearance quality, and to improve battery case layout efficiency and cooling capability.

One embodiment of a battery arrangement structure for a vehicle includes a motor for transmitting drive force to a drive wheel, a battery for supplying electrical power to the motor, and a storage box. The motor is arranged on one side of a vehicle center line oriented in a longitudinal direction of the vehicle, while the battery is arranged on an opposite side of the vehicle center line and around the storage box.

With this structure, a battery and motor, which are often heavy parts used in an electric vehicle, for example, a hybrid vehicle, are distributed to the left and right of the vehicle centerline. Also, since the storage box exists between the battery and the motor, it is possible to reduce the distance between the battery and the motor.

In another embodiment of the present invention, a battery arrangement structure further includes a motor control unit for carrying out drive control of the motor. The motor control unit being arranged around the storage box and at a position facing the battery through the storage box.

With this type of structure, since the battery and motor control unit are arranged together around the storage box, it is possible to ensure utility space, a fuel tank and leg space. Also, since the storage box exists between the battery and the motor control unit, it is possible to reduce the distance between the battery and the motor control unit.

The present invention provides another advantage in that a battery and motor, which are often heavy parts used in an electric vehicle, for example, a hybrid vehicle, are arranged on either side of the vehicle centerline. Also, since the storage box exists between the battery and the motor, it is possible to reduce the distance between the battery and the motor. Further, it is possible to reduce the effects of heat between the battery and the motor.

Since the battery and motor control unit are arranged together around the storage box, it is possible to ensure utility space, a fuel tank and leg space, thereby improving layout efficiency. Also, since the storage box exists between the battery and the motor control unit, it is possible to reduce the distance between the battery and the motor control unit, and it is possible to reduce the effects of heat between the battery and the motor control unit.

In another embodiment of the present invention, a battery mounting structure for a vehicle includes a composite battery comprising a plurality of electric cells stored in a battery case, and the battery case being covered from an outer side by a vehicle body cover, wherein the composite battery is formed from a plurality of electrical cells arranged close together in a single row, the outer surface shape of the battery being formed so as to run substantially along an inner surface shape of the vehicle body cover.

In an instance where a plurality of electric cells are combined in, for example, a bag shape, a difference in distance arises between the battery case and the electric cells for internal electric cells and external electric cells. In the mounting structure of the present invention, however, the distance between each electric cell and the battery case is uniform and short.

In another embodiment of a battery mounting structure the battery case is provided with insertion openings for inserting cords connecting to the composite battery, wherein the insertion openings face the inner side of the vehicle body.

With such a mounting structure, compared to an instance where the insertion openings face the outer side of the vehicle, it is difficult for water to infiltrate into the inside of the battery case from the outside. Also, since an outer edge of the seat for a rider generally protrudes in a sideward direction so as to cover above the vehicle body cover, this protruding section can be used as a roof for the insertion openings facing the inner side of the vehicle. Also, since it is possible to more easily patch the cords coming out from the outside of the insertion openings to the inner side of the vehicle than to the battery case, the cords are not exposed to the outside even when the vehicle body cover is removed, thereby improving maintenance capability.

In another embodiment of a battery mounting structure for a vehicle, the insertion openings are provided in an upper part of the battery case. With such a mounting structure, it is difficult for dirt splashing from a road surface to have any effect.

In another embodiment of a battery mounting structure for a vehicle, a storage box is provided for storing a helmet or the like, and a side cover being part of the vehicle body cover for covering around the storage box, wherein the battery case is provided between the storage box and the side cover. With a small two-wheeled vehicle such as a scooter, it is common for a gap between a storage or luggage box and a side cover to become dead space, but with such a mounting structure, a battery is arranged in this gap.

Since the distance between each electric cell and the battery case is uniform and short, heat generation of the electric cells is improved. Also, since heat generated from each electric cell is also made equal, it is possible to prolong the lifespan of the battery.

Typically, as the insertion openings face the outer side of the vehicle, it is difficult for water to infiltrate into the inside of the battery case from outside. The present invention, however, improves waterproofing with respect to infiltration of water from the outside. Also, since an outer edge of the seat for a rider generally protrudes in a sideward direction so as to cover above the vehicle body cover, this protruding section can be used as a roof for the insertion openings facing the inner side of the vehicle, which further improves waterproofing with respect to infiltration of water from the outside. Also, since it is possible to more easily patch the cords coming out from the outside of the insertion openings to the inner side of the vehicle than to the battery case. Thus, the cords are not exposed to the outside even when the vehicle body cover is removed, such that maintenance capability is improved.

The present invention further provides advantages in that it is difficult for dirt splashing from a road surface to have any effect, thereby improving waterproofing. According to the present invention, particularly with a small two-wheeled vehicle such as a scooter, a battery is arranged in the dead space of a gap between a storage or luggage box and a side cover, such that effective use is made of dead space.

BRIEF DESCRIPTION OF THE DRAWINGS

FIG. 10 is a partially broken away front elevation of the battery shown in FIG. 8.

FIG. 11 is a cross section along line A—A in FIG. 10.

FIG. 12 is a front elevation of a composite battery shown in FIG. 10.

FIG. 13 is a plan view of the composite battery shown in FIG. 10.

DETAILED DESCRIPTION OF PREFERRED EMBODIMENTS OF THE INVENTION

Embodiments of the present invention will now be described in the following description with reference being made to the drawings of FIG. 1 to FIG. 13. In the following description, front side refers to the advancing direction of the vehicle, and right side and left side refer to the right side and the left side facing in the advancing direction of the vehicle.

Figure 1:
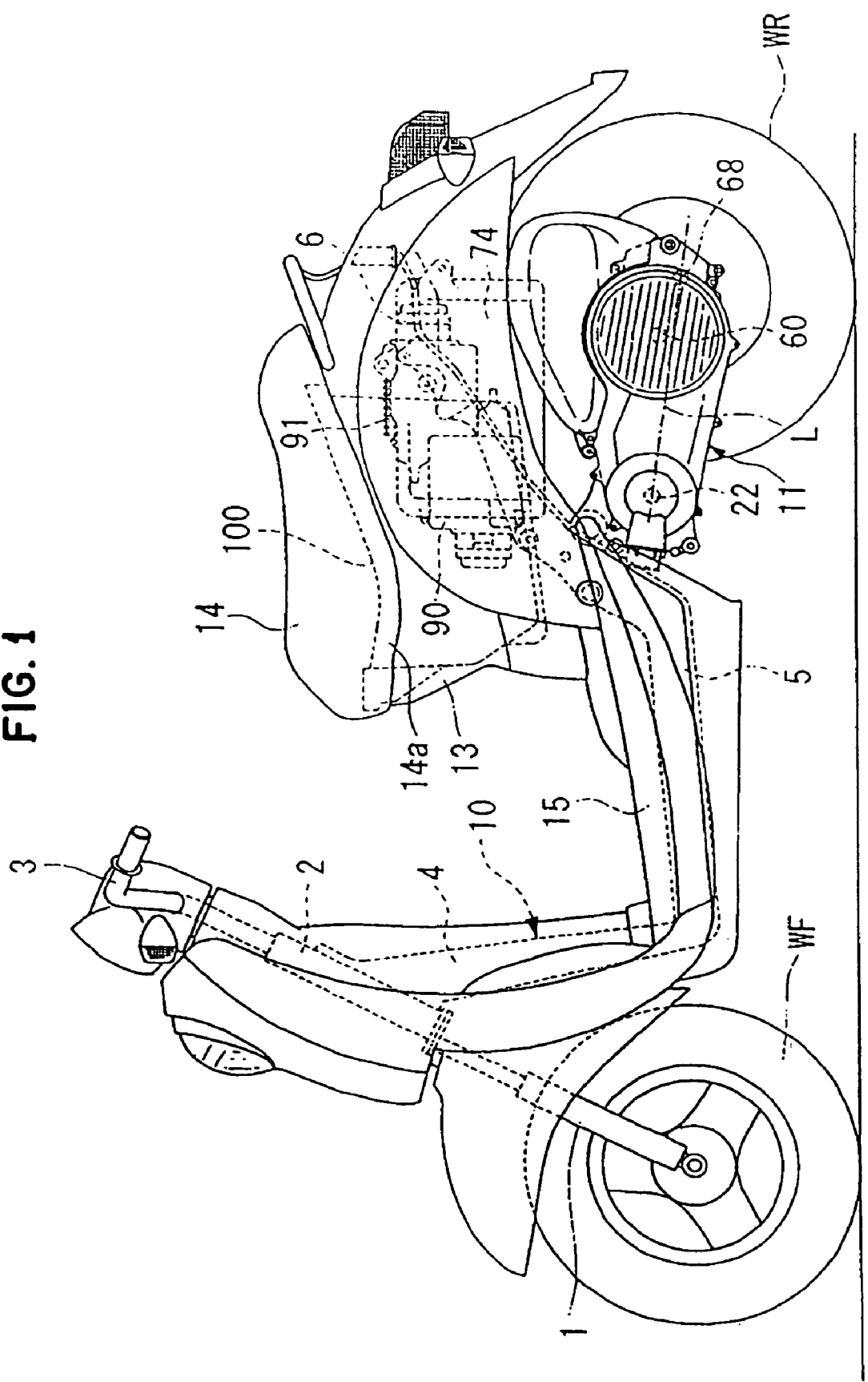
FIG. 1 is a side elevation of a hybrid two-wheeled vehicle of one embodiment of the present invention.

As shown in FIG. 1, a hybrid vehicle of this embodiment preferably is a unit swing type two-wheeled vehicle, having a vehicle frame 10. The vehicle frame 10 includes a front fork 1 where a front wheel WF is axially supported at the front of the vehicle. The front fork 1 is pivoted on a head pipe 2, and can be steered by operating a handle 3. A downpipe 4 running to the rear and down is attached from the head pipe 2, and a middle frame 5 extends substantially horizontally from a lower end of this downpipe 4. Also, a rear frame 6 is formed running rearwards and upwards from a rear end of the middle frame 5. A power unit 11, as a drive power source, includes one end that is pivoted to the vehicle frame 10.

The power unit 11 has a rear wheel WR that is a drive wheel, rotatably attached to another rearward end. The rear wheel WR is suspended from a rear cushion attached to the rear frame 6, whereby a swingable unit swing type is constituted with the pivoted section as a center. Also, the outer periphery of the vehicle frame 10 is covered by a vehicle cover 13, and includes a seat 14 for a rider to sit on being fixed to the rear and on an upper surface of the vehicle cover 13. A step floor for the rider to place their feet on is formed further forward than the seat 14. A storage box 100, functioning as utility space for storing for example a helmet or luggage, is provided below the seat 14.

Figure 2:
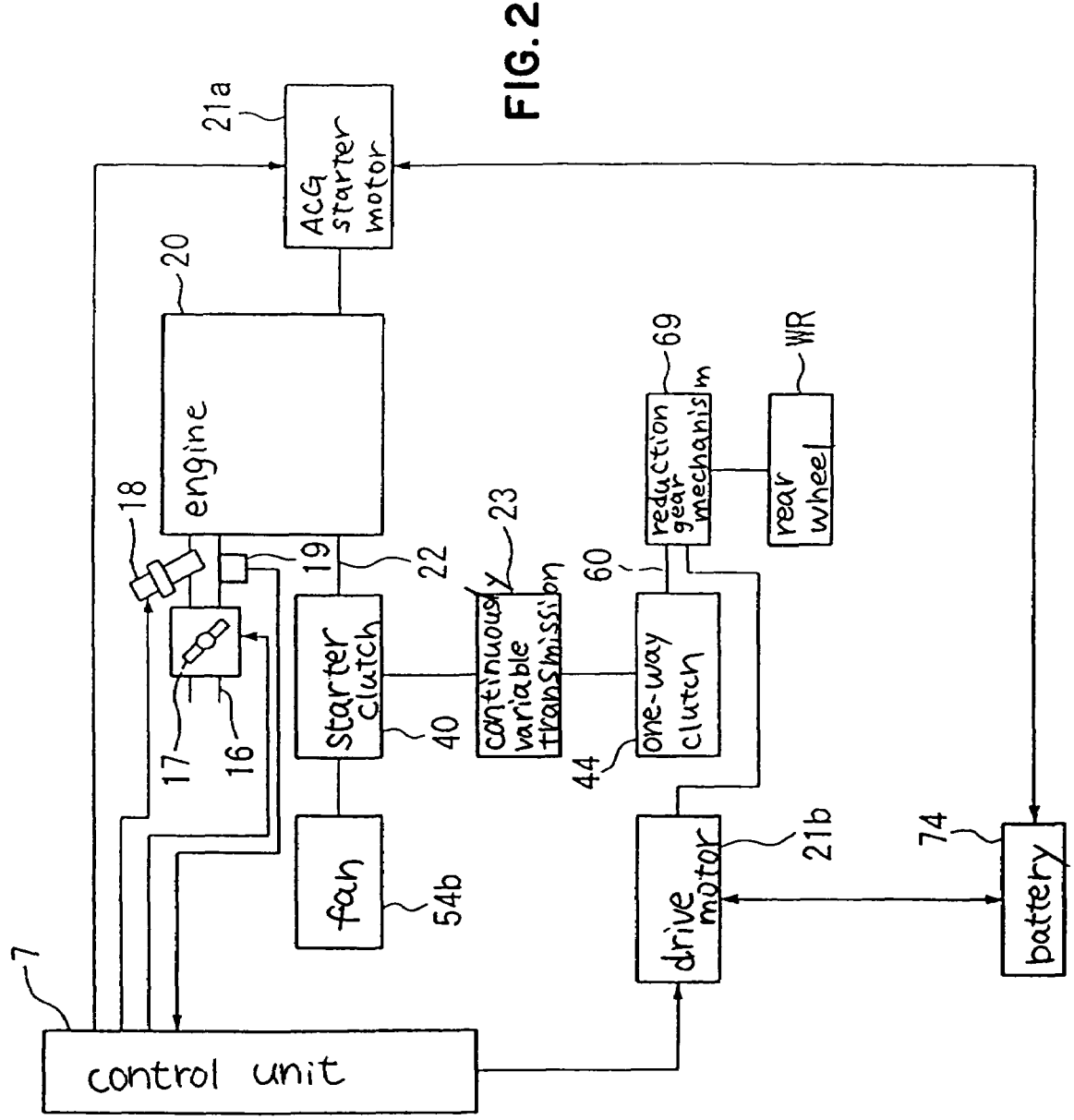
FIG. 2 is a block diagram showing the system structure of the two-wheeled vehicle shown in FIG. 1.

As shown in FIG. 2, the power unit 11 is comprised of an engine 20, being an internal combustion engine obtaining output by combusting an inflammable fuel air mixture, an ACG starter motor 21a functioning as a starter motor and an electrical generator, a continuously variable transmission 23 connected to a crankshaft 22 for transmitting drive force from the engine 20 to the rear wheel WR, which is a drive wheel, a starter clutch 40 for engaging and disengaging drive force transmission between the crankshaft 22 and a drive side of the continuously variable transmission 23, a drive motor (motor) 21b functioning as a motor or an electrical generator, a one-way clutch 44 for transmitting drive force from the engine 20 and drive motor 21b to the rear wheel WR side but not transmitting force from the rear wheel WR to the engine 20 side, and a reduction gear mechanism 69 for reducing output from the continuously variable transmission 23 and transmitting to the rear wheel WR.

Drive force from the engine 20 is transmitted from the crankshaft 22 through the starter clutch 40, continuously variable transmission 23, one-way clutch 44, drive shaft 60 and reduction gear mechanism 69 to the rear wheel WR. On the other hand, drive force from the drive motor 21b is transmitted to the rear wheel WR through the drive shaft 60 and the reduction gear mechanism 69. Specifically, the drive shaft 60 of the continuously variable transmission 23, constituting a drive shaft for the rear wheel WR via the reduction gear mechanism 69, doubles as a motor output shaft of the drive motor 21b.

A battery 74 is connected to the ACG starter motor 21a and the drive motor 21b. When the drive motor 21b functions as a motor and the ACG starter motor 21a functions as a starter, this battery 74 supplies electrical power to the motors 21a and 21b, while when the ACG starter motor 21a and the drive motor 21b are functioning as electrical generators, where the electrical power they generate is used to recharge the battery. Control of the engine 20, ACG starter motor 21a and the drive motor 21b are performed by a control unit 7, being a control means.

The engine 20 has a structure for taking in and combusting a fuel air mixture made up of air from an intake pipe 16 and fuel, and a throttle valve 17 for controlling the amount of air is provided inside the intake pipe in a rotatable manner. This throttle valve 17 rotates according to the extent of operation of a throttle grip (not shown in the drawing) operated by the rider. An injector 18 for injecting fuel and a negative pressure sensor 19 for detecting negative pressure inside the intake pipe are arranged between the throttle valve 17 and the engine 20. If the throttle grip is operated or moved a lot, the throttle valve 17 opens a large amount, and a large amount of air flows through, and the intake pipe negative pressure detected by the negative pressure sensor 19 is small. Accompanying this, the air amount and fuel amount taken into the engine 20 is increased. On the contrary, if the throttle grip is operated or operated only slightly, the throttle valve 17 opens a small amount, and a small amount of air flows through, and the intake pipe negative pressure detected by the negative pressure sensor 19 is large. Accompanying this, the air amount and fuel amount taken in by the engine 20 is reduced.

Figure 3:
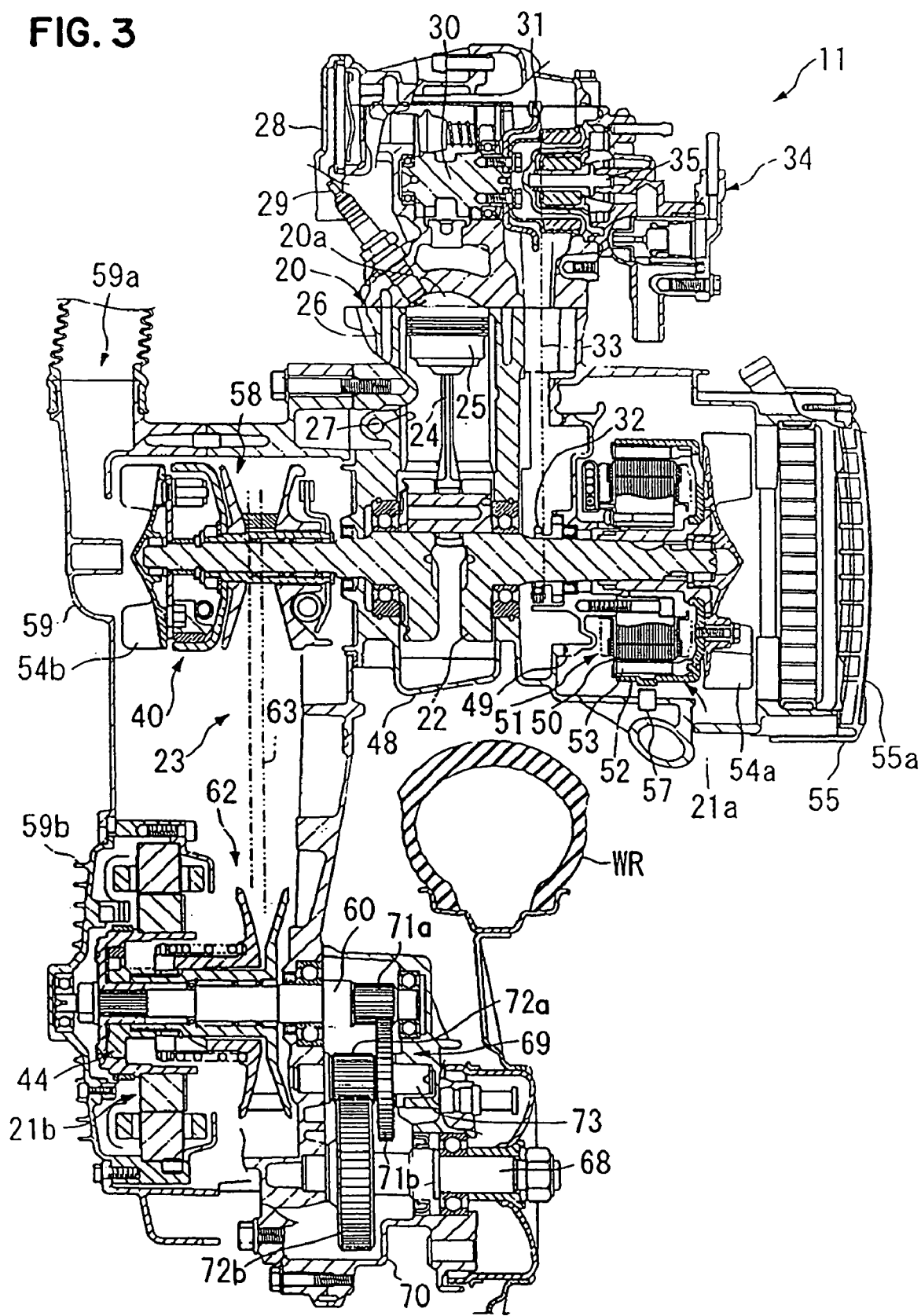
FIG. 3 is a cross sectional drawing showing a power unit of the two-wheeled vehicle shown in FIG. 1.

Next, with reference to FIG. 3, one embodiment of a power unit 11 including the engine 20 and the drive motor 21b will be described. The engine 20 is provided with a piston 25 connected via a con rod 24 to the crankshaft 22. The piston 25 is capable of reciprocating inside a cylinder 27 provided in a cylinder block 26, and the cylinder block 26 is arranged so that the axis of the cylinder 27 is substantially horizontal. Also, a cylinder head 28 is fixed to the front surface of the cylinder block 26, and a combustion chamber 20a for combustion of the fuel air mixture is formed by the cylinder head 28, cylinder 27 and piston 25.

Valves (not shown) for controlling intake or exhaust of the fuel air mixture to and from the combustion chamber 20a, and a spark plug 29, are provided in the cylinder head 28. Opening and closing of the valves is controlled by rotation of a camshaft 30 pivoted in the cylinder head 28. The camshaft 30 has a driven sprocket 31 on one end, with a continuous cam chain 33 wound between the driven sprocket 31 and a drive sprocket 23 provided on one end of the crankshaft 22. As a result, the camshaft 30 is coupled to rotation of the crankshaft 22, and can be caused to rotate. A water pump 34 for cooling the engine 20 is also provided on one end of the camshaft 30. The water pump 34 is attached so that a rotation shaft 35 rotates integrally with the camshaft 30. Therefore, if the camshaft 30 is rotated, the water pump 34 can be activated.

A stator case 49 is connected to a left side, in the vehicle width direction, of the crankcase 48 pivotally supporting the crankshaft 22, and the ACG starter motor 21a is housed inside the stator case 49. This ACG starter motor 21a is a so-called outer rotor type motor, and a stator of the motor is constituted of a coil 51 having conducting wires wound around teeth 50 fixed to the stator case 49. On the other hand, an outer rotor 52 is fixed to the crankshaft 22, and has a substantially cylindrical shape covering the outer periphery of the stator. A magnet 53 is also arranged on an inner surface of the outer rotor 52. A fan 54a for cooling the ACG starter motor 21a is attached to the outer rotor 52. If the fan 54a is rotated in synchronism with the crankshaft 22, air for cooling is taken in from a cooling air intake port formed in a side surface 55a of the cover 55 of the stator case 49.

A transmission case 59 is connected to a left side, in the width direction of the vehicle, of the crankcase 48, and this transmission case holds a fan 54b fixed to a left end of the crankshaft 22, a continuously variable transmission 23 having a drive side connected to the crankshaft 22 via the starter clutch 40, and a drive motor 21b connected to a driven side of the continuously variable transmission 23.

The fan 54b is for cooling the continuously variable transmission 23 and the drive motor 21b housed in the transmission case 59, and is arranged at the same side as the drive motor 21b, with respect to the continuously variable transmission 23, that is in this embodiment, at the left side in the width direction of the vehicle. The cooling air intake port 59a is formed at a vehicle body front side and left side of the transmission case 59. If the fan 54b rotates in synchronism with the crankshaft 22, external air is taken into the inside of the transmission case 59 from the cooling air intake port 59a, which is positioned close to the fan 54b, to forcibly cool the drive motor 21b and the continuously variable transmission 23.

The continuously variable transmission 23 has a belt converter constituted by an endless V-belt 63 wound between a drive side transmission pulley 58 mounted via the starter clutch 40 to a left end of the crankshaft 22 protruding from the crankcase in a widthwise direction of the vehicle, and a drive side transmission pulley 62 mounted via the one way clutch 44 to the drive shaft 60 pivotally supported on the transmission case holding an axial line parallel to the crankshaft 22.

Figure 5:
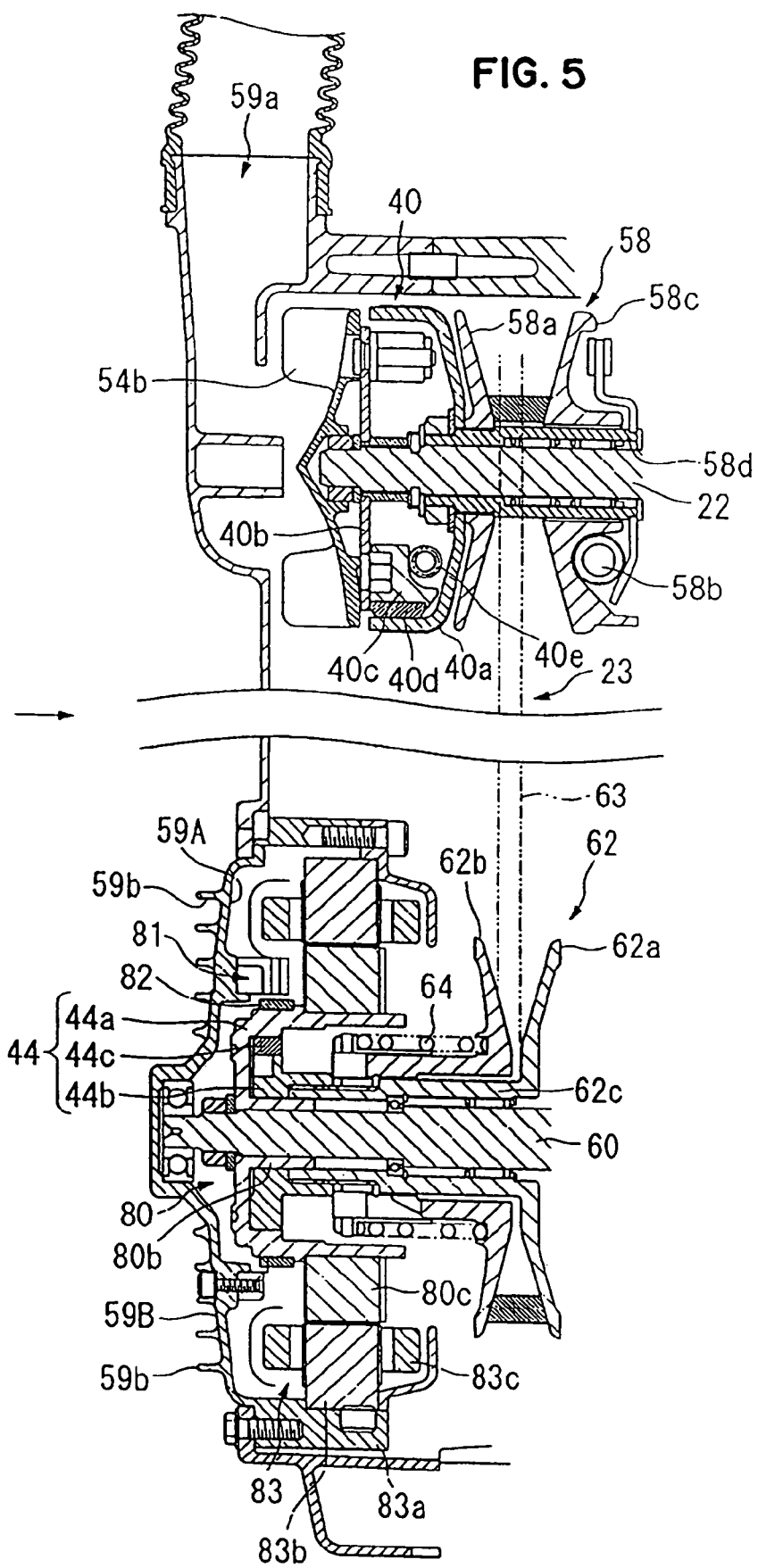
FIG. 5 is an enlarged view of FIG. 3.

The drive side transmission pulley 58, as shown in enlarged form in FIG. 5, is mounted so as to rotate in a circumferential direction with respect to the crankshaft 22, via a sleeve 58d, and is made up of a drive side fixed pulley half body 58a that is fixed on the sleeve 58d and a drive side movable pulley half body 58c that is attached so as to be capable of sliding in an axial direction with respect to the sleeve 58d but is incapable of rotation in the circumferential direction.

On the other hand, the driven side transmission pulley 62 is comprised of a driven side fixed pulley half body 62a attached so that sliding in the axial direction with respect to the drive shaft 60 is restricted but capable of rotation in the circumferential direction, and a driven side movable pulley half body 62b attached on a boss section 62c of the driven side fixed pulley half body 62a capable of sliding in the axial direction. The endless V-belt 63 is then wound in belt grooves having a V-shaped cross section that are respectively formed between the drive side fixed pulley half body 58a and the drive side movable pulley half body 58c, and between the driven side fixed pulley half body 62a and the driven side movable pulley half body 62b. A spring 64 for normally urging the driven side movable pulley half body 62b towards the driven side fixed pulley half body 62a is arranged on a rear surface side (left side in the width direction of the vehicle) of the driven side movable pulley half body 62b.

In this structure, if the rotational speed of the crankshaft 22 rises, for the drive side transmission pulley 58, centrifugal force acts on a weight roller 58b and the drive side movable pulley half body 58c slides to the drive side fixed pulley half body 58a side. The drive side movable pulley half body 58c moves closer to the drive side fixed pulley half body 58*a* by the extent of the sliding, and since the groove width of the drive side transmission pulley 58 is now reduced the contact position of the drive side transmission pulley 58*c* and the V-belt 63 slips to a radially outer side of the drive side transmission pulley 58, so that the diameter the V-belt is wrapped round is increased. Accompanying this, in the driven side transmission pulley 62 the groove width formed by the driven side fixed pulley half body 62*a* and the driven side movable pulley half body 62*b* is increased. Specifically, in response to rotational speed of the crankshaft 22, the diameter the V-belt is wrapped around (transmission pitch diameter) in a continuously variable manner, and the gear ratio is automatically and continuously varied.

The starter clutch 40 is provided more to the outside of the vehicle body than the continuously variable transmission 23 (in this embodiment the left side in the vehicle width direction) that is, between the drive side fixed pulley half body 58*a* and the fan 54*b*, and close to the cooling air intake port 59*a* formed in the transmission case 59. This starter clutch 40 is provided with a cap-shaped outer case 40*a* fixed to the sleeve 58*d*, an outer plate 40*b* fixed to a left end of the crankshaft 22, a shoe 40*d* attached to an outer edge of the outer plate 40*b* via a weight 40*c* so as to face in a radially outer direction, and a spring 40*e* for urging the shoe 40*d* to the radially outer side.

With this structure, if an engine speed or rotational speed of the crankshaft 22, is less than a specified value (for example, 3,000 rpm), transmission of drive force between the crankshaft 22 and the continuously variable transmission 23 is disengaged. If the engine speed rises and the rotational speed of the crankshaft 22 exceeds the specified value, centrifugal force acting on the weight 40*c* resists the urging force from the spring acting towards the radially inner side, and the weight 40*c* is moved to the radially outer side, as a result of which the shoe 40*d* presses the inner peripheral surface of the outer case 40*a* with a force greater than the specified value. In this way, rotation of the crankshaft 22 is transmitted via the outer case 40*a* to the sleeve 58*d*, and the drive side transmission pulley 58 fixed to the sleeve 58*d* is driven.

The one-way clutch 44 comprises a cup shaped outer clutch 44*a*, an inner clutch 44*b* pressed in coaxially with the outer clutch 44*a*, and a roller 44*c* enabling transmission of rotational force in only one direction from the inner clutch 44*b* to the outer clutch 44*a*. The outer clutch 44*a* also serves as an inner rotor body of the drive motor 21*b*, and is the same member as the inner rotor body. Also, the inner periphery of the inner clutch 44*b* and the left end of the boss section of the driven side fixed pulley half body 62*a* are spline-connected to each other. In this way, the one-way clutch 44 is arranged inside the inner rotor 80 of the drive motor 21*b* constituting the inner rotor shape, and is also arranged close, in a vehicle width direction, to the spring 64 arranged at the rear surface side (left side in the vehicle width direction) of the driven side movable pulley half body 62*b*.

In this structure, instead of the drive force from the engine 20 side transmitted to the driven side transmission pulley 62 of the continuously variable transmission 23 being transmitted to the rear wheel WR through the driven side fixed pulley half body 62*a*, inner clutch 44*b*, outer clutch 44*a*, drive shaft 60 and reduction gear mechanism 69, the drive force from the rear wheel WR side when pushing the vehicle or at the time of regenerative motion is transmitted up to the reduction gear mechanism 69, drive shaft 60 and inner rotor body, which is the outer clutch 44*a*. Since this outer clutch 44*a* slips with respect to the inner clutch 44*b*, there is no transmission to the reduction gear mechanism 23 and the engine 20.

The drive motor 21*b* of an inner rotor format for making the drive shaft 60 includes the motor output shaft provided at a vehicle rear side of the transmission case 59. That is, the drive motor 21*b* of this embodiment is attached to the reduction gear mechanism 69 via the drive shaft 60, and is arranged so as to be oriented in the vehicle width direction. The inner rotor 80 is comprised of the drive shaft 60, also being the output shaft of the continuously variable transmission 23, the cup-shaped inner rotor, namely the inner clutch 44*b*, spline fitted to the drive shaft 60 using the boss section 80*b* formed on a central part, and a magnet 80*c* arranged on an opening side outer surface of the inner clutch 44*b*. A plurality of elements to be detected may be detected by a rotor sensor 81 attached to an inner wall 54A of the transmission case 59 are mounted on a bottom side outer surface of the inner clutch 44*b*. On the other hand, the stator 83 is made up of a coil 83*c* having conductive wires wound around teeth 83*b* fixed to the stator case 83*a* inside the transmission case 59.

Because the drive motor 21*b* has the above structure, as well as a function as an electric motor when assisting output of the engine 20, it also functions as an electrical generator (generator) for recharging the battery 74, not shown in FIG. 2, when rotation of the driven shaft is converted to electrical energy. A PWM (Pulse Width Modulation) signal for controlling the drive motor 21*b* and electrical power at the time of regeneration are input and output to terminals (omitted from the drawings).

Figure 4:
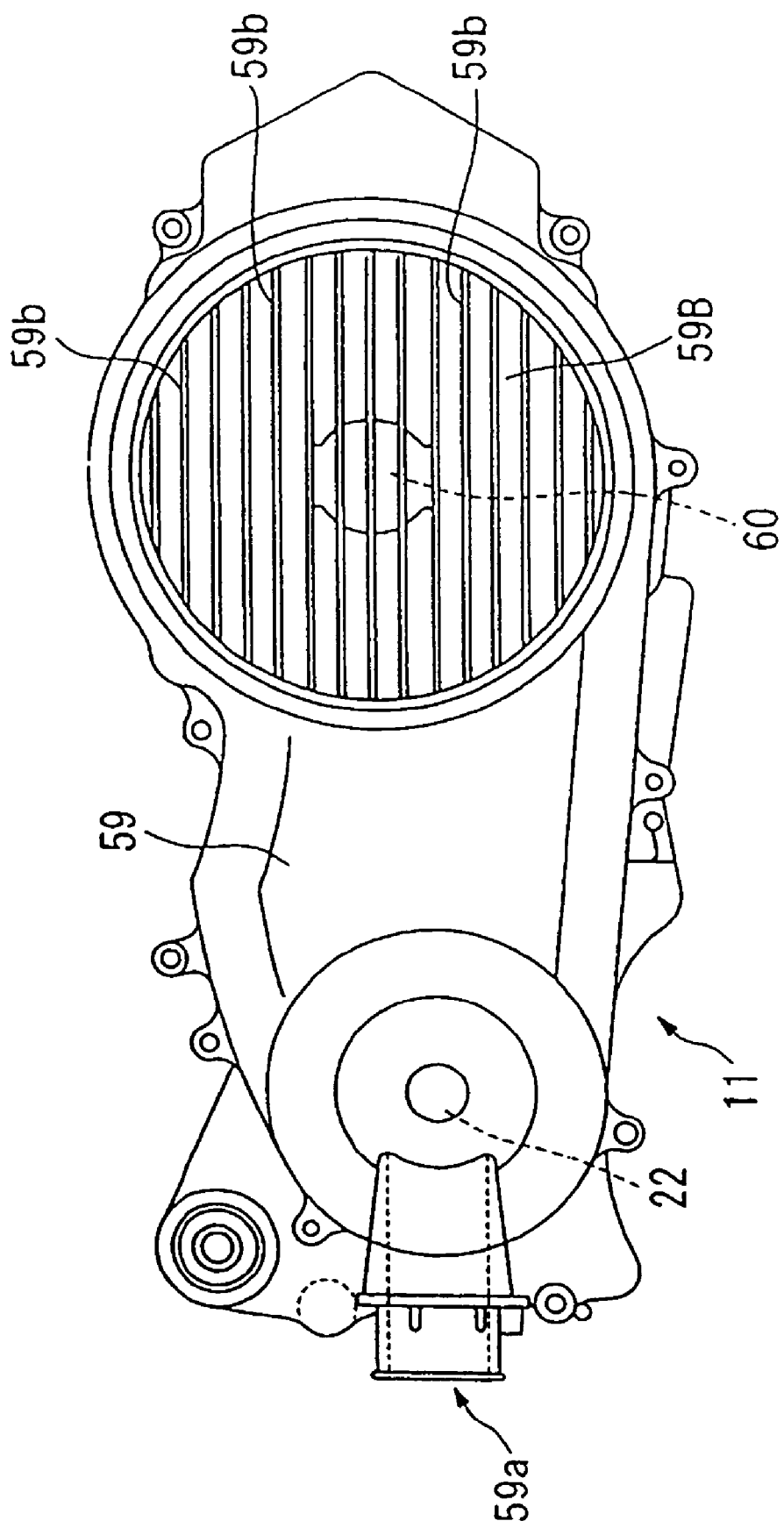
FIG. 4 is an enlarged view of the power unit shown in FIG. 1.

Also, the drive motor 21*b* is directly mounted to the inner wall 59A of the cast transmission case 59 via the stator case 83*a*. As shown in FIG. 4, a plurality of cooling fins 59*b* extending to the rear of the vehicle are provided at equal distances from each other on the outer wall 59B of the transmission case 59 corresponding to direct mounting positions. That is, in plan layout, the drive motor 21*b* is arranged more to the outer side in the vehicle width direction (left side) than the continuously variable transmission 23, namely, at an opposite side to the reduction gear mechanism 69 sandwiching the continuously variable transmission 23. Also, looking at the side of the vehicle in FIG. 1, the drive motor 21*b* is arranged higher up than a line L connecting the crankshaft 22 and the axle 68 of the rear wheel WR, and further forward than the axle 68. That is, the drive shaft 60, being the output shaft of the drive motor 21*b*, is positioned higher up than the line L.

Figure 7:
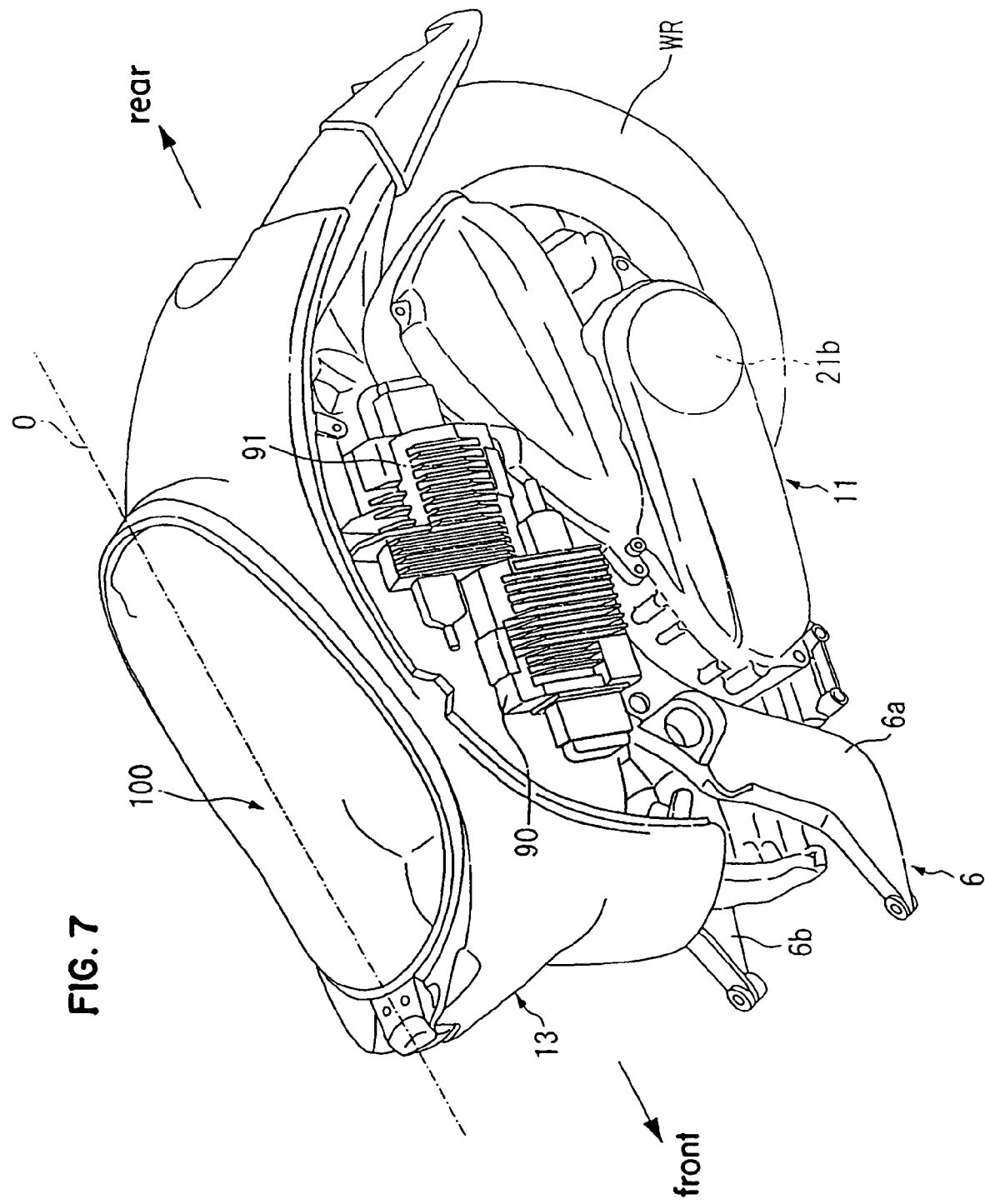
FIG. 7 is a perspective view of a rear frame peripheral edge part of the two-wheeled vehicle shown in FIG. 1, looking from the left side of the vehicle.

In addition to the above, as shown in FIG. 7, the drive motor 21*b* housed inside the power unit 11 is arranged on one side with respect to a vehicle center line O oriented in the longitudinal direction of the vehicle, namely the left side, and around the storage box 100.

The reduction gear mechanism 69 is provided inside the transmission chamber 70 on the rear left side of the transmission case 59, and as well as being provided with a middle shaft 73 pivotally supported parallel to the drive shaft 60. The axle 68 of the rear wheel WR is provided with a pair of first reduction gears 71*a*, 71*b* respectively formed at a right end part of the drive shaft 60 and a central part of the middle shaft 73, and a pair of second reduction gears 72*a*, 72*b* respectively formed at a right end of the middle shaft 73 and a left end of the axle 68. With this structure, rotation of the drive shaft 60 is reduced at a specified reduction ratio, and transmitted to the axle 68 of the rear wheel WR pivoted parallel to the drive shaft 60.

As shown in FIG. 8 to FIG. 13, the battery 74 is configured having a composite battery 75 made up of a plurality of electrical cells 75a housed inside the battery case 76, and is supported in a right side member 6b of a rear frame 6, via brackets 74a, 74b, 4c provided on the battery case 76. That is, compared to arrangement of the drive motor 21b to the vehicle left side of the vehicle centerline O, the battery 74 is arranged on the opposite side of the vehicle center line O to the drive motor 21b, namely, on the vehicle right side.

The composite battery 75 of this embodiment is configured of battery groups 75b arrayed so that 10 electrical cells 75a forming a column contact each other at side surfaces, and form an arc shape looking in an axial direction from top to bottom (FIG. 13), and these electrical cell groups 75 run along the axial direction in three layers. That is, the composite battery 75 is not constructed with 30 electrical cells 75a overlapping each other in a radial direction, but in a single row looking in the axial direction.

Figure 6:
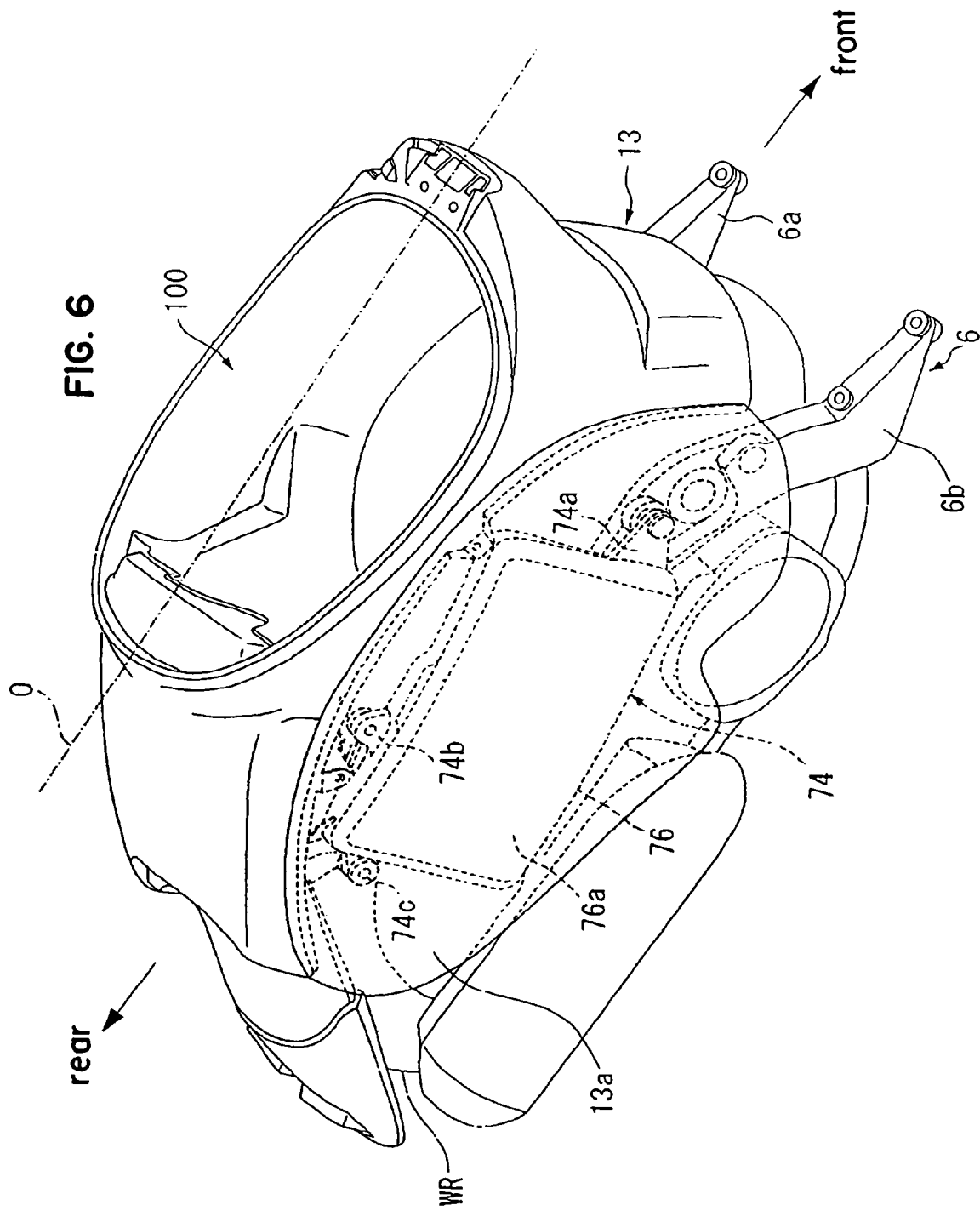
FIG. 6 is a perspective view of a rear frame peripheral edge part of the two-wheeled vehicle shown in FIG. 1, looking from the right side of the vehicle.

As shown in FIG. 6, if the battery 74 is supported on the rear frame 6, the battery case 76 has almost its entirety covered from the outside using a side cover 13a constituting a side part of the vehicle cover 13 used for covering around the storage box 100. That is, the battery case 76 is provided between the storage box 100 and the side cover 13. The battery case 76, as shown in FIG. 8 to FIG. 11, is comprised of an outer case half 76a and an inner case half 76b gripping by both sides of the composite battery 75, with the outer case half body 76a facing the outside of the vehicle and the inner case half body 76b facing the inside of the vehicle, where both define an arc-shaped curve running along the outer shape of the composite battery 75.

Figure 8:
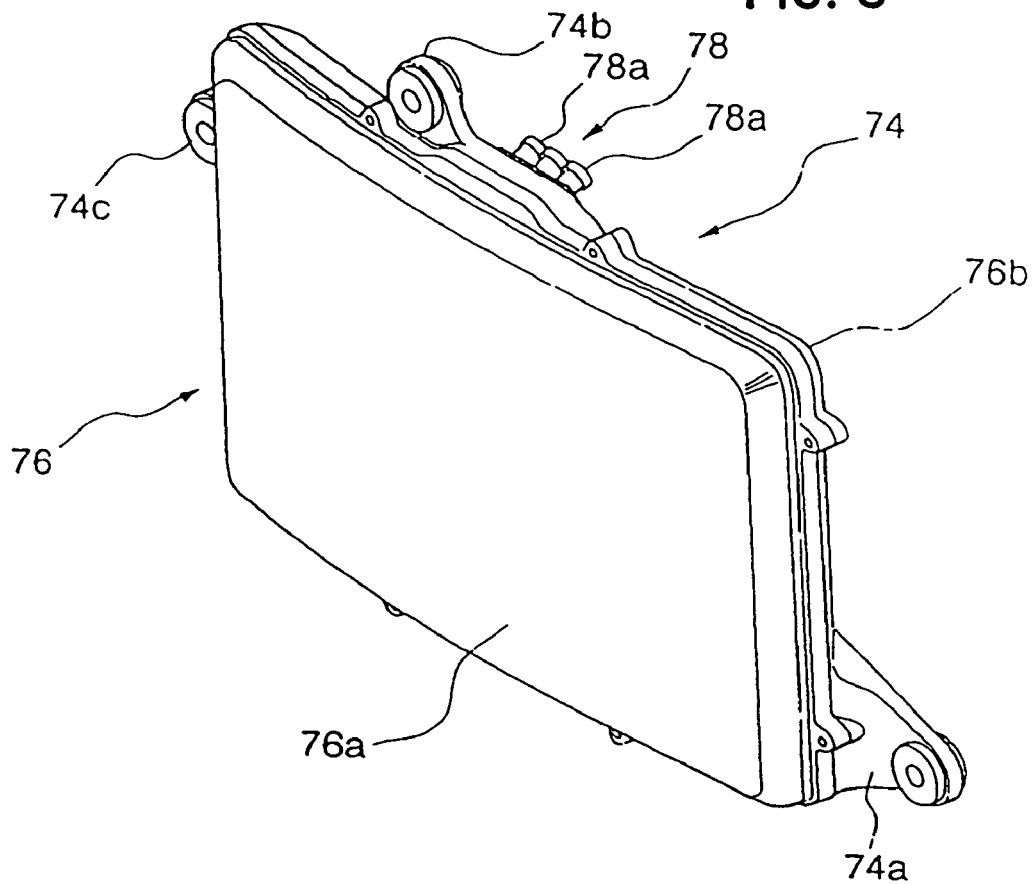
FIG. 8 is a perspective view of a battery shown in FIG. 1, looking from one side.
Figure 9:
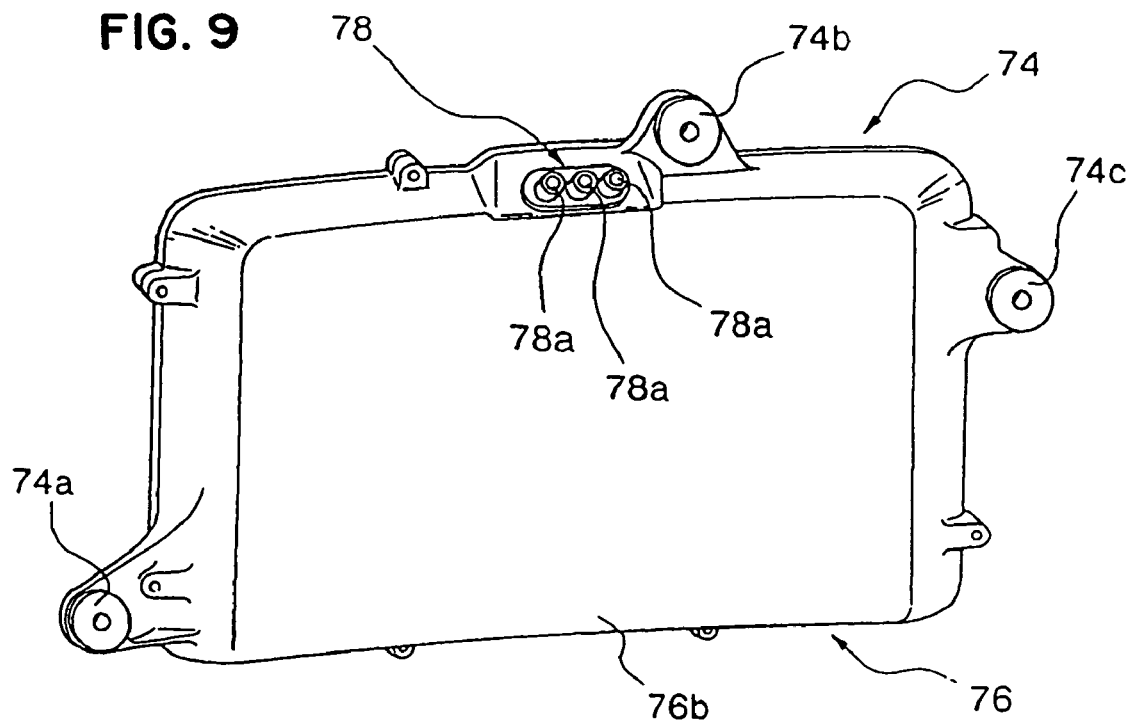
FIG. 9 is a perspective view of the battery shown in FIG. 8, looking from another side.

The outer shape of the outer case half body 76a is constructed so as to run along the inner surface shape of the side cover 13a. On the other hand, as well as the brackets 74a-74c provided on the inner case half body 76b at the outer edge, a grommet 78 formed with a plurality of insertion openings 78a (three in this embodiment) is fitted into an upper central part. The insertion opening 78a are holes for inserting cords 77 to the composite battery, and as shown in FIG. 8, FIG. 9 and FIG. 11. Preferably, the insertion openings 78a face in an inclined direction. Therefore, if the battery is supported on the rear plate 6, the insertion openings 78a are oriented upwards to the inside.

The control unit 7 for control of the engine 20, ACG starter motor 21a and the drive motor 21b is a control means comprising a CPU (Central Processing Unit), ROM (Read Only Memory) and RAM (Random Access Memory). This control unit 7 receives information from devices such as a throttle opening amount sensor for detecting opening amount of the throttle valve 17, a negative pressure sensor 19, rotor sensors 57, 81, and outputs specified control signals to each of the drivers (motor control device) 90, 91 of the ACG starter motor 21a and the drive motor 21b, and to an ignition device for actuating the spark plugs 29 of the engine 20. The drivers 90, 91 for carrying out drive control of the ACG starter motor 21a and the drive motor 21b are both fixed to the left side member 6a of the rear frame 6, as shown in FIG. 7, and arranged around the storage box 100, namely, at the vehicle outer side (left side) and at positions facing the battery 74 via the storage box 100.

As described above, with a hybrid vehicle of this embodiment, by arranging the drive motor 21b at one side, that is the vehicle left side, of a vehicle center line O oriented in the longitudinal direction of the vehicle, while arranging the battery 74 on the other side, that is the vehicle right side, of the vehicle center line O, and around the storage box 11, it is possible to distribute the battery 74 and drive motor 21b on either side of the vehicle center line O thereby improving weight distribution. Also, since the storage box 100 exists between the battery 74 and the drive motor 21b, and it is possible to reduce the distance between the battery 74 and the drive motor 21b, it is possible to reduce the effects of heat between the battery 74 and the drive motor 21b.

In addition to the above, with this embodiment, since the driver 91 is arranged around the storage box 100 and at a position facing the battery 74 via the storage box 11, it is possible to ensure utility space for mounting the battery 74 and the driver 91, and a fuel tank and space for a riders legs. Also, since the storage box 100 exists between the battery 74 and the driver 91, and the distance between the battery 74 and the driver 91 is reduced, it is possible to reduce the effects of heat between the battery 74 and the driver 91.

Also, since the drivers 90, 91 are both arranged on one side of the storage box, that is the left side, and on the opposite side to the battery 74, physically similar parts are lined up on one side in the vehicle width direction, and parts that are physically different are not lined up on one side, whereby layout efficiency and external appearance are improved.

In addition to the above, with this embodiment since a plurality of electrical cells 75a are arranged close together in a single line to form a composite battery 75 that is a single row looking in the axial direction, and the external shape of the battery case 76 is formed so as to run along the inner shape of the side cover 13, in instances such as when the plurality of electrical cells 75a are grouped together in, for example a bag shape, there may be no difference in the distance to the battery case with internal and external electrical cells. That is, the distance between each electrical cell 75a and the battery case 76 is uniform and short, whereby as well as improving heat build-up of the electrical cells 75a, heat generation from each electrical cell 75a is made equal and the lifespan of the electrical cells 75a, and by extension the composite battery 75, can be prolonged.

In addition to the above, with this embodiment, the insertion opening 78a, for insertion of the cords 77, connected to the composite battery 75a faces the inside of the vehicle, which means that the following effects are obtained. Specifically, compared to the case where the insertion openings 78a face outwards, it is difficult for water to infiltrate into the inside of the battery case 76. Also, since the outer edge 14a of the seat 14 protrudes further to the side than the side cover 13a, this protruding section can be used as a roof for the insertion openings 78a facing to the inner side of the vehicle, and it is possible to effectively prevent water entering from the outside. Also, since it is possible to more easily patch the cords 77 coming out from the outside of the insertion openings 78a to the inner side of the vehicle than to the battery case 76, the cords 77 are not exposed to the outside even when the side cover is removed, thereby improving maintenance capability.

In addition, with this embodiment, since the insertion openings are provided at an upper part of the battery case 76, it becomes less likely that dirt splashing from the road surface will have an effect, and waterproofing is further improved. Also, with a small two-wheeled vehicle such as a scooter, a gap between the storage box 100 and the side cover 13a can often become dead space. The battery case 76, however, is provided between the storage box 100, and the side cover 13a the battery 74 is arranged in this gap, making effective use of a typical dead space.

Operation of a hybrid vehicle is as follows. At the time of starting the engine, the crankshaft 22 is caused to rotate using the ACG starter motor 21a on the crankshaft 22. At this time, the starter clutch 40 is not connected, and transmission of drive force from the crankshaft 22 to the continuously variable transmission 23 is disengaged. Then, in synchronism with rotation of the crankshaft 22, a fuel/air mixture taken into the inside of the cylinder 27 is combusted by the spark plug 29, and the piston 25 is caused to reciprocate.

Then, according to the operation amount of the throttle grip, if the rotational speed of the crankshaft 22 exceeds a specified value (for example, 3000 rpm) rotational force of the crankshaft 22 is transmitted via the starter clutch 40 to the continuously variable transmission 23, one-way clutch 44 and reduction gear mechanism 69, to drive the rear wheel WR.

At the time of starting, the drive motor 21b is activated from the battery 74. It is possible to assist rotation of the drive shaft 60 by engine drive force. Also, instead of starting using the engine 20, it is possible to start using only the drive motor 21b. In this instance, rotation of the drive shaft 60 using the drive motor 21b is not transmitted to the driven side transmission pulley 62 because of the one-way clutch 44, and the continuously variable transmission 23 is not driven. In this way, when traveling by driving the rear wheel WR using only the drive motor 21b, energy transmission efficiency is improved.

When traveling using only the engine 20, if the load is large, such as when accelerating or going fast, it is also possible to assist engine travel using the drive motor 21b. At this time, rotational force of the crankshaft 22 due to reciprocation of the piston 25 is transmitted to the drive shaft 60 via the starter clutch 40, the continuously variable transmission 23 and the one-way clutch 44, and drive force from the drive motor 21b is also transmitted via the one-way clutch 44, and these combined forces drive the rear wheel WR via the reduction gear mechanism 69. Conversely, when traveling using only the drive motor 21b, it is also possible to assist motor travel using the engine 20.

When traveling at a steady speed (cruise travel) in the case of traveling with only the drive motor 21b as a drive source, if the connected rotation speed of the starter clutch 40 is less than the above described specified value, even if the engine 20 is operating, the continuously variable transmission 23 is not driven and it is possible to generate electrical power using the ACG starter motor 21a. At the time of this steady speed travel, when traveling with only the drive motor 21b as a drive source, power transmission from the drive motor 21b to the rear wheel WR is carried out without driving the continuously variable transmission 23, such that energy transmission efficiency is improved.

At the time of deceleration, the one-way clutch 44 does not transmit rotation of the drive shaft 60 to driven side transmission pulley 62 of the continuously variable transmission 23, whereby the continuously variable transmission 23 is not driven and it is possible to regenerate rotation of the axle 68 to the drive motor 21b directly via the reduction gear mechanism 69. Specifically, at the time of regenerating the drive motor 21b from the rear wheel WR, a drive force transmitted from the rear wheel WR to the drive motor 21b is not consumed by the continuously variable transmission 23, and so recharge efficiency at the time of regeneration is improved.

The present invention is by no means limited to each of the above embodiments and various design modifications are possible providing such modifications do not deviate from the spirit of the present invention. For example, the subject of application is not limited to a two-wheeled vehicle, and the present invention can also be applied to other moving bodies such as three or four wheeled vehicles.

We claim:

1. A battery arrangement structure for a vehicle, comprising a seat, a motor for transmitting drive force to a drive wheel, a battery for supplying electrical power to the motor, and a storage box disposed under the seat, wherein
the motor is arranged on one side of a vehicle center line oriented in a longitudinal direction of the vehicle, while the battery is arranged on an opposite side of the vehicle center line and around the storage box, and the storage box is between the motor and the battery.

2. The battery arrangement structure of claim 1, further comprising a motor control unit for carrying out drive control of the motor, the motor control unit being arranged around the storage box and at a position facing the battery through the storage box.

3. A battery mounting structure for a vehicle, comprising:
a composite battery including a plurality of electrical cells stored in a battery case, the battery case being covered from an outer side by a vehicle body cover, wherein the composite battery is formed such that the plurality of electrical cells are arranged close together in a single row, and an outer surface shape of the composite battery being formed so as to run substantially along an inner surface shape of the vehicle body cover, and a storage box and a side cover being part of the vehicle body cover for covering around the storage box, and the battery case is provided between the storage box and the side cover.

4. The battery mounting structure for a vehicle of claim 3, wherein the battery case is provided with an insertion opening for insertion of cords connecting to the composite battery, wherein
the insertion opening faces an inner side of the vehicle body.

5. The battery mounting structure for a vehicle of claim 4, wherein the insertion opening is provided in an upper part of the battery case.

6. A battery arrangement structure for a vehicle, comprising:
a motor for transmitting drive force to a drive wheel, a battery for supplying electrical power to the motor, and a storage box; wherein the motor is arranged on one side of a vehicle center line oriented in a longitudinal direction of the vehicle, while the battery is arranged on an opposite side of the vehicle center line and around the storage box; and a motor control unit for carrying out drive control of the motor, the motor control unit being arranged around the storage box and at a position facing the battery through the storage box.

* * * * *